United States Patent [19]

Coutts et al.

[11] 4,405,541

[45] Sep. 20, 1983

[54] VIDEO DISC PROCESSING

[75] Inventors: Maurice D. Coutts, Plainsboro; Dennis L. Matthies, Princeton, both of N.J.

[73] Assignee: RCA Corporation, New York, N.Y.

[21] Appl. No.: 316,314

[22] Filed: Oct. 29, 1981

[51] Int. Cl.³ ............................................. B29D 17/00
[52] U.S. Cl. ................................. 264/107; 264/233; 425/810
[58] Field of Search ...................... 264/106, 107, 233; 425/810

[56] References Cited

U.S. PATENT DOCUMENTS 4,228,050 10/1980 Martin et al. .................... 260/23
4,275,100 6/1981 Datta .................................. 369/286

Primary Examiner—Thomas P. Pavelko
Attorney, Agent, or Firm—Birgit E. Morris; Howard F. VanDenburgh

[57] ABSTRACT

High density information discs, such as video discs, which have been treated with an ammonium salt become resistant to and stable under conditions of high relative humidity, even after repeated exposure to such conditions for extended periods of time. The treatment with the ammonium salt is accomplished by use of a bath of an aqueous solution of the ammonium salt, with the preferred ammonium salt being ammonium chloride.

10 Claims, No Drawings

VIDEO DISC PROCESSING

This invention relates to the manufacture of high density information discs, also known as video discs. More particularly, this invention pertains to the improved manufacture and processing of such discs to improve their storage stability, and particularly their stability or resistance to conditions of high relative humidity.

BACKGROUND OF THE INVENTION

Martin et al, in U.S. Pat. No. 4,228,050, have disclosed an improved molding composition for the compression molding of high density information discs, also known as video discs. This molding composition is a conductive molding composition, containing sufficient conductive carbon black particles to obtain the desired conductivity (bulk resistivity below about 500 ohm-cm at 900 megahertz), along with other desired additives such as stabilizers, lubricants, plasticizers, and processing aids. The remainder of the conductive molding composition is a polyvinylchloride based resin, and the molding composition has the proviso that not more than about 5 percent by weight of liquid additives are present. Molded articles, such as high density information disc replicas, molded from this improved conductive molding composition are said to be dimensionally stable and possess improved resistance to the effects of changes in environmental temperatures and humidity.

However, we have found that the stability of these discs with respect to environmental fluctuations of temperature and relative humidity have been less than satisfactory. Discs which on initial playback have excellent or acceptable playback characteristics deteriorate with respect to playback after storage under conditions of high temperature and high relative humidity.

Huck et al., in copending application Ser. No. 091,878, filed Nov. 7, 1979, and entitled "VIDEO DISC PROCESSING," have disclosed that high density information discs which have been cleaned with an aqueous solution have improved stability to changing environmental conditions and therefore possess acceptable playback characteristics. The use of water alone or dilute solutions of acids or bases are shown to remove water soluble metal salts and other water soluble materials, such as certain organic impurities, on the surface of the disc, which materials contribute to the moisture sensitivity of the disc.

Datta, in copending application Ser. No. 109,206, filed Jan. 4, 1980, entitled "VIDEO DISC PROCESSING," has disclosed that an aqueous solution comprising an oxidizing agent, a base, and an amount of a flourosurfactant which will produce a solution having a surface tension below about 35 dynes/cm$^2$ is an excellent cleaning solution for high density information discs. It has been shown that by the use of this aqueous cleaning solution, metal salts including calcium, barium, nickel, lead, and tin salts, sulfur compounds, and organic compounds, such as esters, which are originally present on the surface of the disc are removed from the disc surface, thereby lessening its sensitivity to moisture.

However, upon exposure to conditions of elevated temperature and relative humidity for extended periods of time, the discs deteriorate such that their playback characteristics are no longer excellent and in some cases are not even acceptable. Thus, the search has continued for better disc materials and processing to improve the stability of high density information discs to conditions of high relative humidity, particularly repeated exposures to such conditions and exposures to such conditions for extended periods of time.

SUMMARY OF THE INVENTION

We have found that by treating or cleaning high density information discs, such as video discs, with an ammonium salt, the discs become more resistant to and more stable under conditions of high relative humidity, particularly after repeated exposure to such conditions. The ammonium salt treatment is usually accomplished by use of a bath of an aqueous solution of the ammonium salt. The preferred ammonium salt solutions are solutions of the ammonium halides, particularly ammonium chloride.

DETAILED DESCRIPTION OF THE INVENTION

The high density information discs treated in accordance with the present invention are molded from a molding composition comprising a polymer of vinylchloride; finely-divided conductive carbon black particles; a stabilizer system which is generally a mixture of tin salts that scavenge or take up hydrochloric acid formed as a decomposition product of the vinylchloride polymer during processing; a lubricant system which generally is composed of both an internal lubricant, to modify the melt viscosity of the molding composition during processing, and an external lubricant to provide release of the molded article, such as a video disc, from the mold; and a flow modifier system which is generally composed of plasticizers and processing aids to reduce the melt viscosity of the molding composition during the processing, all as set forth in Martin et al. (U.S. Pat. No. 4,228,050), referred to above and incorporated herein by reference.

When large amounts of conductive particles, such as carbon black, are present in the molding composition, the melt viscosity generally increases, necessitating higher molding temperatures or larger amounts of plasticizers and processing aids. Since the present carbon-loaded polyvinylchloride molding compositions employed for the video disc contain from about 12 up to about 20 percent by weight of carbon black or even higher, depending on the type of carbon black used, several processing aids and plasticizers must be added to obtain the melt flow properties required to compression mold the information disc, which contains information as very small surface relief patterns in an information track. Sufficient lubricants must be added to promote ready release of the molded article from the mold because any release problems will result in distortion of the record during forced release, and even distortion of the stamper from which it is molded, which ruins all succeeding discs made from that stamper.

During compression molding of a video disc from the above-described conductive molding composition, and more specifically from the conductive molding composition of Martin et al. (U.S. Pat. No. 4,228,050) referred to hereinabove, many of the additives or reaction products of these additives, including decomposition or reaction products of the additives with the PVC or with each other, migrate to the surface of the disc where they form a thin film. This thin film is a complex mixture of various organic and inorganic materials. It is this thin film which is sensitive to moisture and conditions of high relative humidity, all of which cause problems in the playback of the video disc.

When an as-pressed disc is exposed to the conditions of the atmosphere, small droplets of water condense on the surface of the disc due to the presence of deliquescent materials, even if the relative humidity remains below 100%. Any salts or other water soluble materials that are present on the surface of the disc, whether under or adjacent to the water droplets, are dissolved by the water droplets. The water droplets may also dissolve water soluble materials below the surface of the disc, such as by a wicking or leaching effect. As this water evaporates, salts are left on the surface of the disc, not now as a uniform thin film, but as lumps or deposits. These deposits may cover several information tracks and they may fill up the information pattern as well. Thus, the information present in the track beneath the deposits is masked or lost during playback by the stylus, which rides over the deposits resulting in a loss of signal or dropout of the audio, video, and/or color information in that area. Additional signal losses occur because the stylus may dislodge some of these deposits during playback, and they may collect beneath or in front of the stylus which results in further distortion or losses of the signal.

The distortion, loss of signal, or dropout of the audio, video, and color information is measured and reported as carrier distress time. The present standard, or pass criteria, for such loss of signal or dropouts for an acceptable video disc is a maximum of 3 seconds in 60 minutes of playback time, and good quality is considered to be less than 0.3 second in 1 hour of playback time. The carrier distress time is measured by adding the amount of time in seconds (but discounting intervals of less than 10 microseconds) when the RF output of the player arm is less than 150 millivolts peak to peak (referenced to a one volt reference level) and the time when the RF output is above 8.6 megahertz or below 3.1 megahertz in frequency, indicating a defect. Such defects are noted by the viewer as dropouts, up to a complete loss of the picture and sound information.

We have found that by treating or cleaning these discs with an ammonium salt, particularly a solution of an ammonium salt and preferably an aqueous solution of an ammonium halide, the discs become more resistant to atmospheric conditions, particularly atmospheric conditions of high moisture content, and furthermore become more stable to repeated exposure to conditions of high relative humidity. Additionally, the so-treated discs maintain their original low level of carrier distress after repeated exposure to conditions of high relative humidity.

The ammonium salt treatment employed is a bath of an aqueous solution of the ammonium salt which contains from about 1.0 to about 12.0 percent by weight of the ammonium salt, and preferably from about 2.0 to about 5.0 weight percent of the ammonium salt in the aqueous solution. A variety of ammonium salts can be used in the treatment of the discs, such as ammonium chloride, ammonium bromide, tetramethyl ammonium chloride and tetramethyl ammonium bromide. However, we have found that a preferred ammonium salt treatment is a bath of an aqueous solution containing from about 2.5 to about 5.0 percent by weight of ammonium chloride.

The discs can be treated or cleaned by immersing in the ammonium salt solution, or by spraying and the like. The ammonium solution can be agitated to improve the treatment of the disc, as by mechanical stirring or ultrasonic agitation and the like. A turbulent type of action of the cleaning ammonium salt solution can also be directed at the surface of the disc, if desired, to aid in the treating of the disc. Multiple immersions of the disc in the ammonium salt solution can be employed, and a final rinse with purified water is normally and beneficially used. After treatment, the discs are normally air or solvent dried.

The following specific examples are included in order to illustrate the invention and the improvement thereof with greater particularity. However, it is to be understood that these examples are not intended to limit the invention in any way.

EXAMPLES I-V

For these examples, a series of video discs were compression molded from a molding composition containing approximately 75.15 parts of the PVC resin 346 referred to in Martin et al. identified hereinabove, 14.8 parts of Ketjenblack EC carbon particles, 1.5 parts of T-35 and 1.0 part of Mark 275 as stabilizers, 0.75 part of G-30, 0.25 part of G-70, 0.5 part of calcium stearate, and 0.3 part of Olio de Vasilina as lubricants, 0.75 part of K-175 processing aid, 2.0 parts of K-147 processing aid, and 3.0 parts of Santicizer 711 modifier, all as referred to in U.S. Pat. No. 4,228,050 to Martin et al. referred to hereinabove.

The discs from this press run were then divided into 5 lots of 12 discs each for use in Example I, Example II, Example III, Example IV and Example V, respectively, for purposes of further processing and comparative evaluation. The discs of each lot and each Example were further treated and processed according to the procedures set forth under each Example heading as set forth hereinbelow.

Following the treatment set forth in each of Examples I–V set forth hereinbelow, a lubricant layer was applied to each and every video disc of each lot for each respective Example, as a 0.3 percent solution in heptane of the lubricant of the formula:

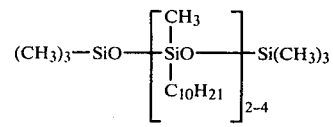

made in accordance with the methods described by Wang et al. in copending application Ser. No. 065,064, filed Aug. 9, 1979, and U.S. Pat. No. 4,275,101.

After application of the lubricant layer, the carrier distress time was measured and determined for the initial playback of each disc of each lot. Thereafter, each of the five lots of discs (each containing 12 discs) was subjected to environmental stress conditions of high temperature and high relative humidity. In this testing, the discs were taken from ambient room temperature conditions and placed into a chamber maintained at 100° F. (37.7° C.) and 95 percent relative humidity and held under these conditions for a period of 1 hour. Thereafter the discs were transferred to and held for a period of 1 hour at ambient room temperature conditions. Each of the discs was then played and the carrier distress measured and determined for each disc.

Then all of the discs (all five lots) were re-subjected or exposed as before to environmental stress conditions of high temperature and high relative humidity (100° F. (37.7° C.) and 95 percent RH). As before, the discs were played and the carrier distress time was measured and determined for each disc after this second exposure to environmental conditions of high temperature and high relative humidity.

Thereafter, all five lots of the discs (each containing 12 discs) were once again subjected or exposed, (for a third time) as before, to environmental stress conditions of high temperature and high relative humidity (100° F. (37.7° C.) and 95% RH). As in each of two previous cases, the discs were played and the carrier distress time was measured and determined for each disc after this third stress testing under environmental conditions of high temperature and high relative humidity. The results obtained in these tests are summarized in the table set forth hereinbelow. Also shown in the Table is the percent of the 12 discs of each lot of each Example which pass the 3 seconds in 60 minutes of playback time criteria referred to hereinabove.

EXAMPLE I

For this Example, the lot of 12 discs was used as a control and was treated in accordance with the heretofore known and commercially used video disc cleaning or treating process. This commercially used treating process includes cleaning the discs with a 5 percent aqueous solution of Shipley 1160B conditioner, commercially available from the Shipley Co., which is then followed by a rinsing of the discs with deionized water and thereafter drying the discs in a freon (dichlorodifluoromethane) atmosphere.

EXAMPLE II

In this Example, each of the 12 discs of the lot was treated as in Example I with the exception that the improvement of this invention, the substitution in the process of the ammonium salt solution rinse for the aqueous solution of Shipley conditioner, was carried out. The ammonium salt solution used in this Example was an aqueous solution containing approximately 10 percent by weight of ammonium chloride, which solution was employed as a bath maintained at approximately room temperature (about 25° C.).

EXAMPLE III

For this Example, the lot of 12 discs was treated in a manner similar to that set forth in Example II above, with the single exception being that the bath of the aqueous solution of ammonium chloride (again containing approximately 10 percent by weight of ammonium chloride) was maintained at a temperature of approximately 110° F. (43° C.).

EXAMPLE IV

The lot of 12 discs in this Example was treated in accordance with the treatment set forth in Example III, with the single exception being that the bath of ammonium chloride employed was a solution containing approximately 5 percent by weight of the ammonium chloride.

EXAMPLE V

In this Example, each of the 12 discs of the lot was treated in accordance with the treatment set forth hereinabove in Example III, with the single exception being that the bath of the aqueous solution of ammonium chloride employed comprised an aqueous solution containing approximately 2½ percent by weight of the ammonium chloride.

TABLE

| Example | Carrier Distress in Sec. per 60 Min. Playback Time Initial Play | | | After 1st Stress Test | | | After 2nd Stress Test | | | After 3rd Stress Test | | |
|---|---|---|---|---|---|---|---|---|---|---|---|---|
| | Median | Range | % Pass 3 Sec. | Median | Range | % Pass 3 Sec. | Median | Range | % Pass 3 Sec. | Median | Range | % Pass 3 Sec. |
| I | 0.1 | 0–28 | 67% | 59 | 0.5–294 | 17% | 55 | 7.0–135 | 0% | 73 | 1.8–214 | 0% |
| II | 0.6 | 0–63 | 67 | 3.0 | 0–29 | 42 | 2.3 | 0.1–11 | 42 | 1.9 | 0.2–36 | 33 |
| III | 71 | 4–352 | 0 | 0.6 | 0.1–72 | 75 | 0.3 | 0–18 | 67 | 0.7 | 0.2–4.6 | 83 |
| IV | 0.4 | 0–31 | 67 | 0.5 | 0.1–3.5 | 83 | 2.0 | 0.2–24 | 50 | 0.5 | 0.1–3.4 | 83 |
| V | 0.8 | 0–3.0 | 75 | 1.0 | 0–79 | 58 | 0.6 | 0–2.9 | 83 | 0.3 | 0–99 | 75 |

As can be seen by a careful analysis of the above Table and the data contained therein, the improved disc treatment of this invention, with aqueous solutions of ammonium salts, provides an improvement in the carrier distress of the treated discs after exposure to environmental conditions of high temperature and high relative humidity, when compared to the prior known and commercially used treating process. The rinsing of high density information discs, such as video discs, with the aqueous ammonium salt solution process of this invention, has been found to be an effective means of lowering the carrier distress and reducing ambient aging of the discs and their sensitivity to conditions of high relative humidity and high temperature.

We claim:

1. In the manufacture of a conductive, high density information disc having video and audio information in the form of geometric variations in an information track which can be reconstituted in electrical signal form with a playback stylus, wherein a conductive plastic is molded to form said high density information disc, the improvement which comprises treating the surfaces of said high density information disc with an ammonium salt selected from the group consisting of ammonium chloride, tetramethyl ammonium chloride, tetramethyl ammonium bromide and ammonium bromide to render the playback quality of said high density information disc substantially resistant to and stable under conditions of high relative humidity.

2. A process in accordance with claim 1, wherein said ammonium salt is employed in an aqueous solution, said solution containing from about 2 up to about 12 percent by weight of ammonium salt based on the total weight of the treating solution.

3. A process in accordance with claim 1, wherein said ammonium salt is employed as an aqueous solution of ammonium chloride, said solution containing from about 2 up to about 5 percent by weight of ammonium chloride based on the total weight of the treating solution.

4. A process in accordance with claim 1, wherein a lubricant is applied to the treated surfaces of said high density information disc.

5. A process in accordance with claim 4, wherein said lubricant has the formula:

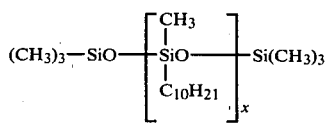

wherein x is an integer of about 2–4.

6. In a method of fabricating a high density information disc replica which comprises dry blending a polyvinylchloride resin with additives including conductive particles, stabilizers, lubricants, and flow modifiers, molding the resultant blend to form a high density information disc replica, and applying a thin lubricant layer to the surfaces of the disc replica, the improvement which comprises treating the surfaces of said high density information disc replica with an ammonium salt selected from the group consisting of ammonium chloride, tetramethyl ammonium chloride, tetramethyl ammonium bromide and ammonium bromide to render the playback quality of said high density information disc replica substantially resistant to, and stable under, conditions of high relative humidity, prior to applying the lubricant layer.

7. A method in accordance with claim 6, wherein said treating is carried out by employing an aqueous solution of said ammonium salt, said solution containing from about 2 up to about 12 percent by weight of said ammonium salt based on the total weight of the treating solution.

8. A method in accordance with claim 6, wherein said treating is carried out by employing an aqueous solution of ammonium chloride, said solution containing from about 2 up to about 5 percent by weight of ammonium chloride based on the total weight of said aqueous solution.

9. A method in accordance with claim 6, wherein said lubricant layer consists essentially of a siloxane of the formula:

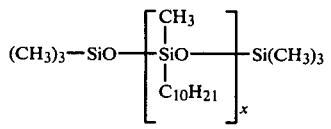

wherein x is an integer of about 2–4.

10. A method in accordance with claim 6, wherein said additives include at least 12 percent by weight of the molding composition of conductive carbon black particles.

* * * * *